Jan. 1, 1957  R. W. KLING  2,776,036
LOADING MACHINE
Filed Jan. 17, 1955  4 Sheets-Sheet 1

INVENTOR.
Robert W. Kling
BY
Attorney

Jan. 1, 1957 R. W. KLING 2,776,036
LOADING MACHINE
Filed Jan. 17, 1955 4 Sheets-Sheet 2

INVENTOR.
Robert W. Kling
BY
Attorney

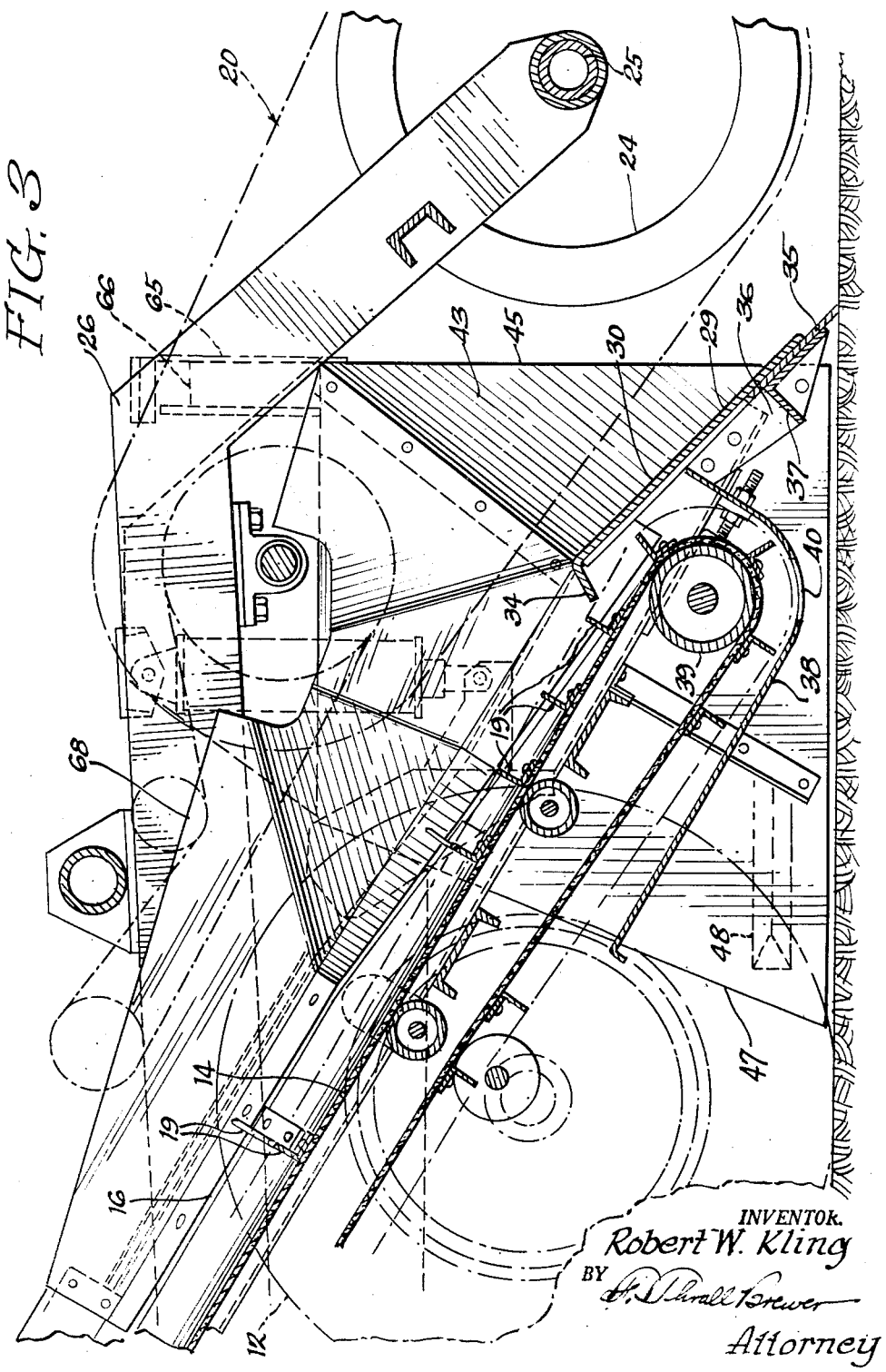

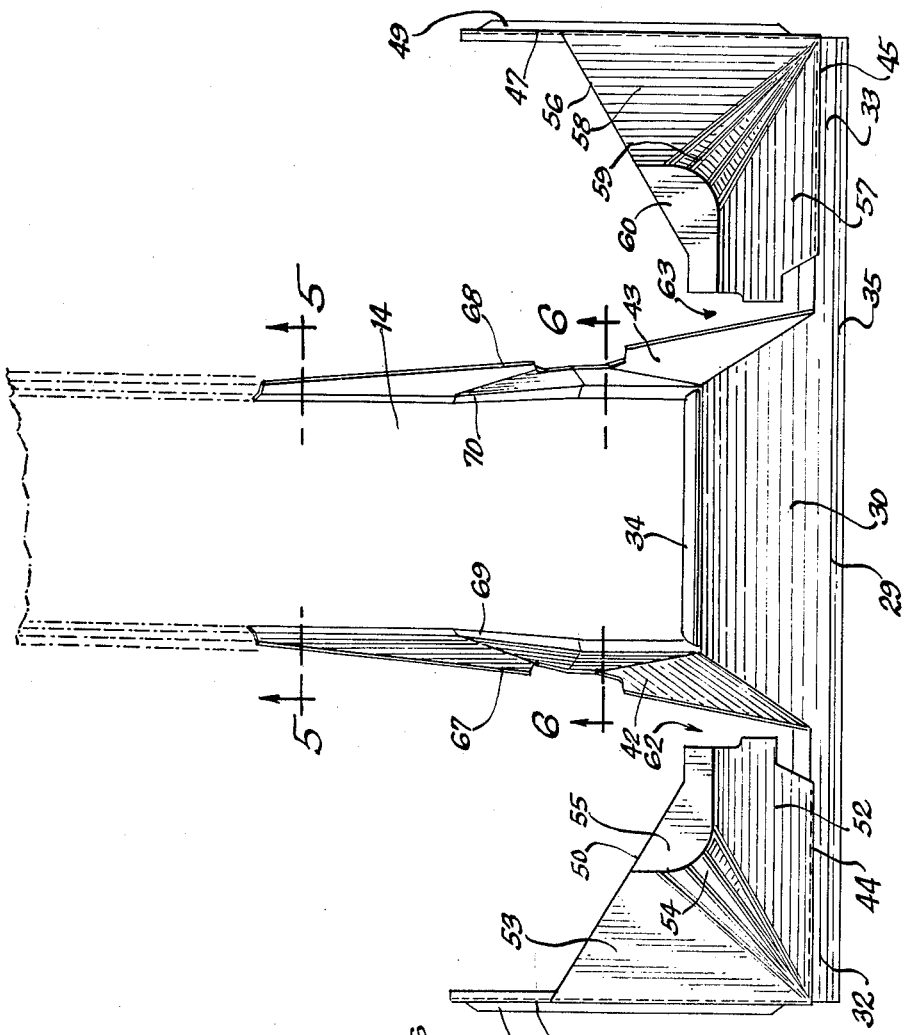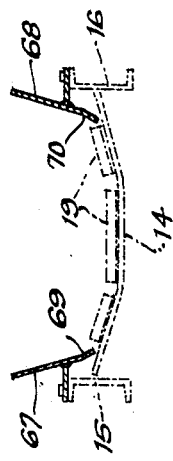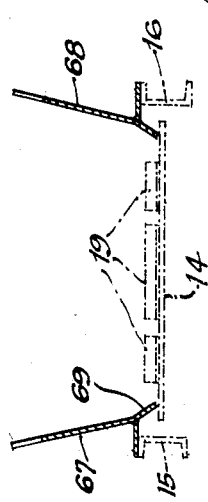
INVENTOR.
Robert W. Kling

United States Patent Office 2,776,036
Patented Jan. 1, 1957

2,776,036

LOADING MACHINE

Robert W. Kling, Wilmette, Ill., assignor to Athey Products Corporation, Chicago, Ill., a corporation of Illinois Application January 17, 1955, Serial No. 482,141

9 Claims. (Cl. 198—9)

This invention relates to loading machines, and more particularly to such machines which are not only self-motivated and maneuverable, but which are adapted to use for loading different kinds of materials without effecting undesired polutions of materials as a result of mixture of one material with another, by virtue of structural features making the loader self-cleaning.

A general object of my invention is to provide a loading machine embodying an elevating conveyor and surfaces for guiding material onto the elevating conveyor, and wherein all portions of the material guiding surfaces are disposed at an angle steeper than the angle of repose of materials normally loaded by the machine, and at positions such that materials are shed from the guiding surfaces to either the conveyor or the ground.

My invention has for another object the provision of a loading machine which is particularly adapted, although not necessarily limited, to use in loading from stockpiles and the like, as in quarries and building material yards, where different kinds of materials are loaded intermittently and where the mixture of one material with another is to be avoided.

As another object, this invention has within its purview the provision of a loading machine having a material gathering plate associated at the front with driven material moving elements and having fender structures which coact with the material gathering plate to prevent stockpiled material from spilling over the top of the material gathering plate when the material of a stockpile or the like caves in or avalanches during loading operations, in which instance, material behind the plate would be drawn away from the pile and spread when the machine is moved to a different position.

It is another object of the invention to provide a loading machine having fender elements associated with a front material gathering plate, and wherein the slope of the fender elements is determined to shed material forwardly and in relationship to the angle of sight of an operator, so as to afford maximum visibility for a required gathering plate height.

This invention has for a further object the provision of front end structure including material gathering plate, material guide plates and fender elements of the type to which reference has been made, and adapted to production and installation as an attachment for existing loaders of a comparable type.

My invention further comprehends the provision of a loading machine having surfaces sloped to shed material by gravity to the ground or the conveyor, and in which the surfaces are either flat or shingled so as to prevent the retention of material thereon.

I have also provided in the loading machine of this invention a front pulley guard for the elevating conveyor, which guard has openings therein for the normal escape of material from within the guard.

These and other objects of this invention will become apparent from the following detailed description when taken together with the accompanying drawings in which:

Fig. 3 is a fragmentary side sectional view of the front portion of the loading machine illustrated in Figs. 1 and 2;

Figure 1:
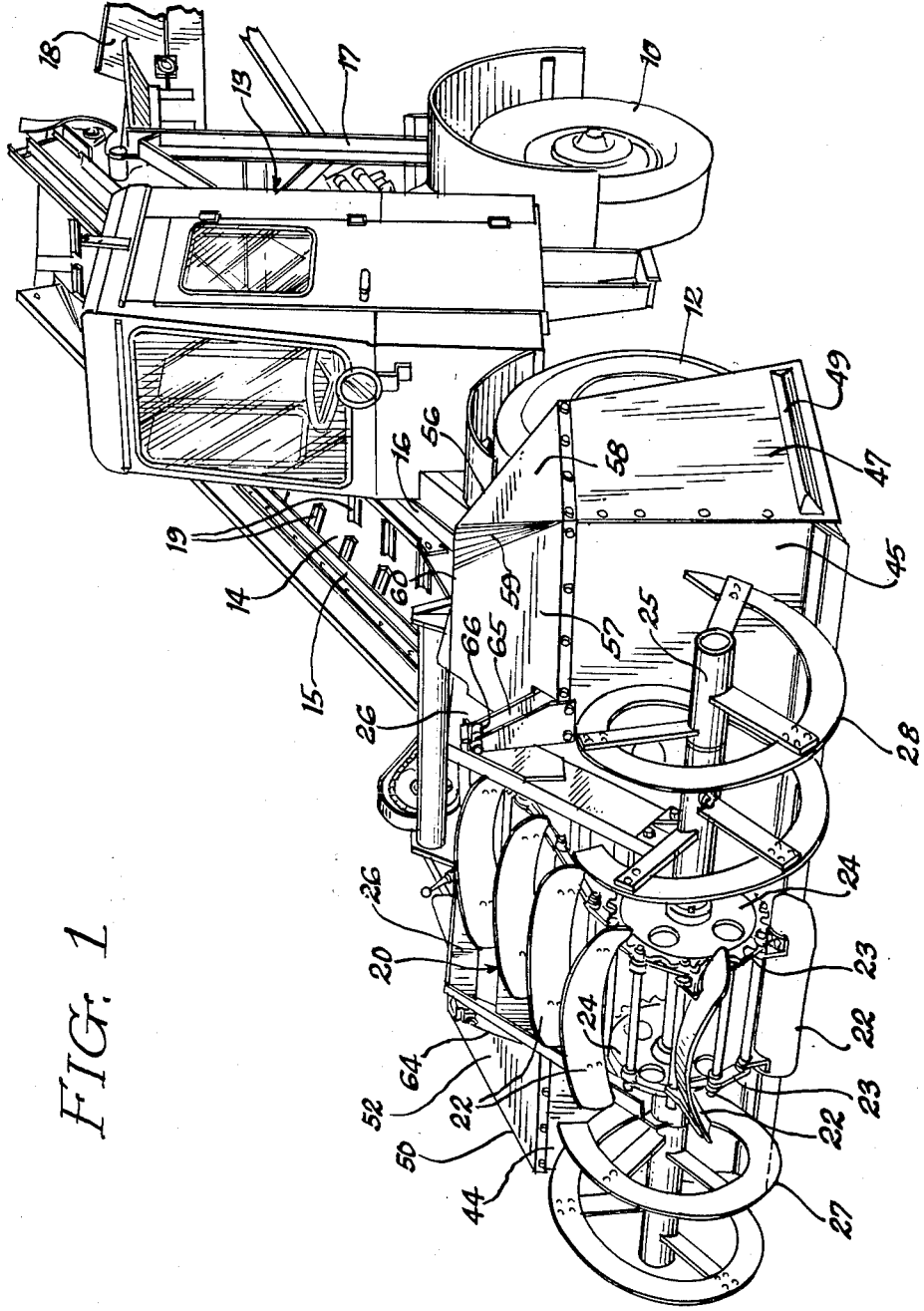
Fig. 1 is a perspective view taken from in front and to one side of a loading machine embodying a preferred form of my invention, and illustrates the parts of the machine in their normal operating positions.
Figure 2:
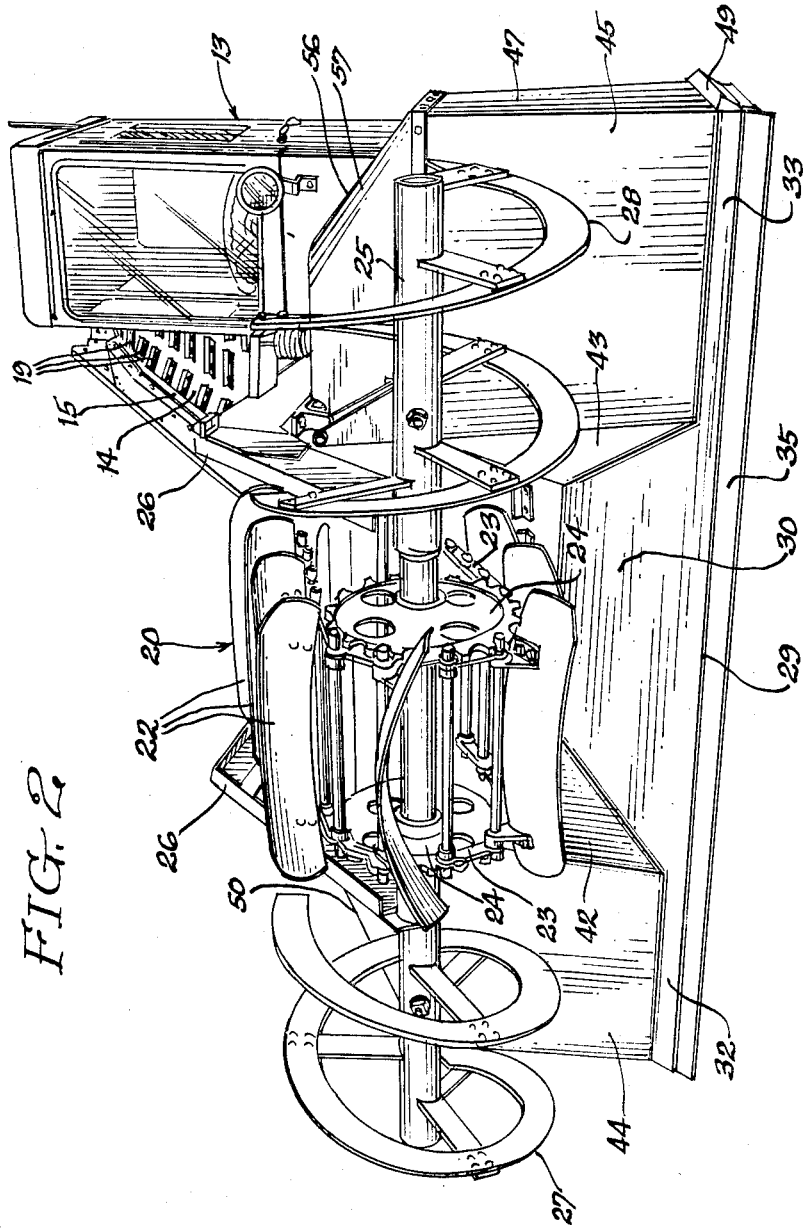
Fig. 2 is another perspective view of the loading machine shown in Fig. 1, taken from more in front of the machine and showing certain material moving parts of the machine in an elevated position.

Fig. 4 is a top plan view of metal plate structure utilized in the loading machine depicted in Figs. 1, 2 and 3, which metal plate structure constitutes a salient feature of this invention; and Figs. 5 and 6 are end sectional views which are respectively taken substantially on lines 5—5 and 6—6 of Fig. 4 and in the directions indicated by accompanying arrows.

In certain structural details and more general aspects, the loading machine herein disclosed is similar to those shown and described in my Patents No. 2,648,422, issued August 11, 1953 for Swivel Conveyor and Means for Mounting and Driving the Same, and No. 2,669,338, issued February 16, 1954, for Power Operated Conveyor-Type Loading Machine, both of which patents are assigned to the same assignee.

Considered generally, the exemplary embodiment of my loading machine which is shown in the accompanying drawings for illustrative purposes is a mobile and unitary structure carried by rear driven wheels 10 and front steerable wheels 12. The loading machine herein illustrated utilizes as a prime mover an internal combustion engine (not shown) which is carried at the rear of the structure and serves to drive both the driven wheels 10 and driven material moving parts of the loading machine, with the control of the operating parts of the machine and the steering of the steerable front wheels 12 being effected by an operator from an operator's cab 13 supported at one side and near the front of the loading machine.

The disclosed loading machine includes a belt-type loading conveyor 14 carried on side beams 15 and 16 and supported at its rear end by frame structure 17. The structure herein illustrated also includes a belt-type auxiliary conveyor 18 supported at the rear of the machine for receiving material from the conveyor 14 and for delivering that material to a position which can be adjusted both laterally and vertically of the machine. The elevating conveyor 14, as disclosed, has cleats 19 secured to its material carrying surface for assisting with the movement of material by the conveyor belt.

At the front end of the disclosed loading machine and in alignment with the elevating conveyor 14 is a feeding conveyor 20, which feeding conveyor has material moving plates 22 carried by chains 23, the chains being supported on sprockets such as 24. The sprockets 24 are secured to and supported by a cross shaft 25 which is journalled in bearings at the forward ends of supporting arms, those arms being supported from the frame structure of the loading machine for vertical swinging movement, so that the position of the feeding conveyor 20 and other parts carried by the shaft 25 may be varied relative to ground level, as depicted in Figs. 1 and 2. At opposite sides of the feeding conveyor 20, auger-type pusher conveyors 27 and 28 are secured to the shaft 25 and are each disposed to move material inwardly toward the feeding conveyor while being normally driven through the feeding conveyor and the shaft 25.

In order to adapt this loading machine having the general structural characteristics hereinabove described to the alternate and intermittent loading of various materials that should not be intermixed, and further to adapt the machine to loading from stockpiles as, for example, in building material yards and stone quarries, I have provided front plate and fender structures including parts which shed material either to the ground surface or to the conveyor, so that the machine may be readily cleaned by running it for a short period after backing it away from stockpiled material which has been loaded. Also, my front plate and fender structure is adapted to prevent stockpiled material from spilling over parts of the machine which would tend to spread and waste it when the machine is backed away from a stockpile from which it has been used for loading purposes. Thus, the loading machine herein disclosed is not only adapted to road work and windrow loading, but is also particularly suited to the intermittent loading of stockpiled materials such as plasterers' sand, agricultural limestone, graded materials such as aggregates used in concrete and also bituminous road surfacing materials. It may be readily understood that the pollution of one such material with another would be objectionable and that a self-cleaning machine is very desirable in places in which such materials are intermittently loaded by the same machine.

Referring in greater detail to the structure of my loader as herein disclosed, and particularly to the portions of the structure which render it self-cleaning and particularly suited to uses, such as stockpile loading, a bottom plate 29 is secured to the forward ends of the conveyor supporting beams 15 and 16 and has a mid-portion which, in addition to sloping downwardly toward the front from a position over the front end of the elevating conveyor, underlies the feeding conveyor 20 and diverges forwardly from a width substantially corresponding to that of the elevating conveyor. In addition, the bottom plate 29 has side portions 32 and 33 which extend outwardly from the forward part of opposite sides of the mid-portion to extend the overall width of that bottom plate and to define a substantially straight forward edge thereon, the side portions 32 and 33 being substantially coplanar with respect to the mid-portion 30. At the rear end of the mid-portion 30, an integral lip 34 slopes downwardly and rearwardly, and overlies the front end of the elevating conveyor 14. The downward slopes of the forward portions of the bottom plate 29, including the mid-portion 30 and the side portions 32 and 33, as well as the rearward slope of the lip 34, are selected so as to be greater than the angle of repose of normally encountered granular materials and the like, so that such materials will tend normally to slip from such surfaces by gravitational force. This angle with respect to the normal ground line may be, for example, of the order of about 40 degrees or steeper.

Along the forward edge of the bottom plate 29, a cutting blade 35 is secured thereto to provide a cutting edge which establishes the level from which material is gathered by thte loading machine. As depicted in Fig. 3, the cutting blade 35 underlies the forward marginal portion of the bottom plate 29 to provide surfaces which shed material forwardly to the ground, and to avoid the provision of an edge which would tend to retain material and prevent it from sliding from the bottom plate. The cutting blade 35 is additionally supported and rigidified by an angle piece 37 supported from the conveyor side beams 15 and 16 by plates such as 36.

As shown in Fig. 3, a guard plate 38 is mounted below the forward end of the belt conveyor 14 to protect that conveyor and its forward supporting pulley 39 from objects over which the front of the loading machine may pass. This plate extends laterally between the conveyor supporting side beams 15 and 16 and is curved rearwardly from a position in front of the front conveyor pulley 39 to extend upwardly and rearwardly below the lower surface of the front portion of the belt conveyor.

At a position immediately below the front conveyor pulley 39, and at the lowest position of the guard plate 38, a series of openings 40 is provided in spaced relationship laterally of the guard plate to provide for the drainage of material which may tend to gather in the space between the guard plate and the forward end of the conveyor.

At the opposite sides of the mid-portion 30 of the bottom plate 29, throat plates 42 and 43 of generally frusto-triangular shape adjoin the side edges of the mid-portion and extend upwardly therefrom, with their planes diverging upwardly and converging rearwardly. Since the throat plates 42 and 43 are spaced more widely than the width of the feeding conveyor 20, their forward divergence provides relief for the passage of gathered material around the forward edges of those plates and they concentrate the flow of such material to the width of the elevating conveyor as it is moved rearwardly by the feeding conveyor.

Front plates 44 and 45 adjoin the forward edges of the throat plates 42 and 43 respectively, and also are substantially co-extensive with and adjoined to the rear edges of the side portions 32 and 33 of the bottom plate. These front plates 44 and 45, in the disclosed structure, extend upwardly to a level above the auger-type pusher conveyors 27 and 28 when they are in their normal operating positions, as shown in Fig. 1, and provide surfaces along which material is moved by those pusher conveyors, as well as affording supports for stockpiled material in which the loading machine is operating. At opposite outer edges of the front plates 44 and 45, side plates 46 and 47, which are of substantially the same height as the front plates, extend rearwardly therefrom a substantial distance to prevent material from a stockpile or the like from sliding into the space behind the front plates 44 and 45.

Near their bottoms, the side plates 46 and 47 are reinforced and stiffened by reinforcing ribs 48 and 49 which, in the present instance, are of triangular section and are secured to the external surfaces of the plates and extend longitudinally thereof. A cap 50 having angularly disposed and sloped upwardly converging walls 52 and 53 adjoined through a rounded and tapered corner portion 54, as well as a flat top surface portion 55, is secured to the tops of the front wall 44 and the side wall 46 to prevent material from spilling over the tops of those front and side walls and to shed material forwardly and laterally to the ground surface for cleaning purposes. A similar cap is secured to the tops of the front wall 45 and side wall 47. This cap has angularly disposed and upwardly converging front and side walls 57 and 58 respectively adjoined through a rounded and tapered corner portion 59. Also, a flat top portion 60 is provided on the cap 56. As shown in Fig. 4, spaces 62 and 63 are provided between the caps 50 and 56 and the adjacent throat plates 42 and 43 respectively to afford openings for the upward and downward movements of the supporting arms 26. As shown in Fig. 1, side brackets 64 and 65 secured to the tops of the front plates 44 and 45 carry rollers such as 66 which serve as guides for the vertical swinging movements of the supporting arms 26.

As shown in Figs. 4, 5 and 6, the throat plates 42 and 43 are adjoined by rearwardly extending side plates 67 and 68 respectively, which latter mentioned side plates extend along opposite sides of the forward portion of the elevating conveyor 14. These side plates confine the material to the conveyor belt during the initial transfer of such material to the elevating conveyor after it is moved across the mid-portion 30 of the bottom plate and between the throat plates 42 and 43 by the feeding conveyor 20. The side plates 67 and 68 have lower marginal portions 69 and 70 respectively which are disposed in obtuse angular relationship to the upper portions of those plates to confine the spread of the material adjacent the surface of the conveyor belt. It may be observed that in this instance, as well as in the instances of the various surfaces of the bottom plate, front plates, side plates and front and side surfaces of the caps, the angles of all such surfaces with respect to the normal ground line are such that material is either shed therefrom to the ground surface or to the belt, because the angles are greater than the normal angles of repose of materials generally encountered. To determine the heights of the front plates and the slopes of the front walls 52 and 57, the problem of affording maximum visibility to an operator in the cab 13 has been given consideration. The slopes of the front walls 52 and 57, in addition to being calculated to shed material forwardly, correspond approximately to the normal angle of visibility from the operator's cab, and the front walls 44 and 45 are made as high as possible commensurate with the aforementioned considerations.

From the foregoing description and references to the accompanying drawings, it may be readily understood that I have provided a front plate and fender structure for use on loaders which is self-cleaning and which minimizes the spreading of material by the movement of the machine away from a stockpile or the like from which material has been loaded. That is, the front fender and plate structure is composed of parts which are all disposed in such angular relationship to the normal ground level that they normally shed all material which comes in contact therewith either to the ground or to the belt conveyor. The belt conveyor can be cleaned readily by running the machine, including the belt conveyor, for a short period after the supply of material thereto has been stopped by moving the machine somewhat away from the material source. In addition, the fender and plate arrangement is such that it prevents any appreciable quantities of material from spilling over or around the exterior surfaces of the plates or fenders as a result of sliding or avalanching of material from a stockpile or the like, so that such material would be in a position to be spread over the surface of the ground when the machine is backed away from the stockpile or other source of material.

It is worth while to note that the front end plate and fender structure herein disclosed is adapted to production and sale as an accessory sub-assembly for application to loaders which are already in use, as well as to initial installation on a loader when it is produced for sale.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a mobile loader having a belt-type elevating conveyor, a feeding conveyor for moving gathered material to the elevating conveyor, and pusher-type side conveyors for moving material in laterally toward opposite sides of the feeding conveyor, a front structure comprising, in combination, a bottom plate having thereon a front cutting edge of a length to extend along both the feeding and side conveyors, said bottom plate including a mid-portion for underlying the feeding conveyor and sloping upwardly to the elevating conveyor at an angle greater than the angle of repose of dry granular material and relatively narrow end portions on opposite sides of the mid-portion, throat plates diverging upwardly and converging rearwardly on opposite sides of the mid-portion of the bottom plate, front plates adjoining the throat plate and extending outwardly along and upwardly from the end portions of the bottom plate, side plates extending rearwardly from opposite outer ends of the front plates, and cover plate means forming caps secured to the tops of the front and side plates and having surfaces sloping forwardly to the front plates and outwardly to the side plates at angles greater than the angle of repose of dry granular material.

2. In a mobile loader as defined in claim 1, the front structure being further characterized by plates extending rearwardly from the throat plates along opposite sides of the elevating conveyor and all portions of which plates slope downward toward the elevating conveyor at angles greater than the angle of repose of dry granular material, so as to shed material to the elevating conveyor.

3. In a mobile loader as defined in claim 1, the front structure being further characterized by a cover plate secured to and extending rearwardly from the bottom of the mid-portion of the bottom plate to a position below the elevating conveyor for protecting the front of the elevating conveyor, and said cover plate having openings at the lowest portion thereof for the drainage of material from the upper surface thereof.

4. In a mobile loader as defined in claim 1, the front structure being further characterized by a cutting blade secured to the front margin of the bottom plate to provide said cutting edge, and said cutting blade underlying the bottom plate so that material sheds forwardly from the bottom plate across the cutting blade.

5. In a mobile loader having a belt-type elevating conveyor, a power operated feeding conveyor aligned with the elevating conveyor, and pusher-type side conveyors on opposite sides of the forward portion of the feeding conveyor for moving material inwardly to the feeding conveyor, a front plate and fender structure comprising a bottom plate having a front cutting edge thereon which extends along the feeding and side conveyors, said bottom plate having a mid-portion across which material is moved to the elevating conveyor by the feeding conveyor, throat plates converging rearwardly on opposite sides of the mid-portion of the bottom plate, front plates adjoining the forward edges of the throat plates and extending outwardly along and upwardly from the bottom plate, side plates adjoining and extending rearwardly from opposite outer ends of the front plates, and means providing caps secured to the tops of the front and side plates which have surfaces sloping forwardly and outwardly to the respective front and side plates.

6. In a mobile loader as defined in claim 1, the front plate and fender structure being further characterized by plates extending rearwardly from the rear edges of the throat plates above side margins of the elevating conveyor and all portions of which plates slope downwardly at an angle such that they shed material to the elevating conveyor.

7. A front plate and fender structure for use on a mobile loader and of substantially symmetrical shape and structure relative to a longitudinal center plane, each half of the plate and fender structure comprising a bottom plate having a substantially straight front edge defined by a relatively narrow end portion extending away from the central plane and an adjoining central portion of materially greater width than the end portion, said central portion tapering rearwardly toward the central plane, a frusto-triangular throat plate adjoined to and extending upwardly from the side of the central portion of the bottom plate remote from the central plane, a substantially rectangular front plate adjoined to the front of the throat plate and to the rear of the end portion of the bottom plate and extending upwardly from the bottom plate, a side plate adjoined to the outer side portion of the front plate and extending rearwardly therefrom so that the throat plate, front plate and side plate together form a box-type fender structure, and a cap having wall portions sloping forwardly to the top of the front plate and outwardly to the top of the side plate to provide a cover for the front and side portions of said fender structure.

8. A front plate and fender structure as defined in claim 7, and further characterized by an extension plate adjoining the rear of the throat plate and extending rearwardly therefrom, and said extension plate having inner surface portions sloping downwardly at relatively steep angles and devoid of ledges that would tend to retain material.

9. A front plate and fender structure for use on a mobile loader and comprising, in combination, a bottom plate having a cutting edge at the front thereof and providing a mid-portion across which material is moved from ground level to an elevated position, said mid-portion being shaped to converge rearwardly, and fender structures at opposite sides of the mid-portion of the bottom plate, said fender structures each including a throat wall adjoining and extending upwardly from the said rearwardly converging mid-portion of the base plate, a front wall adjoining the front of the throat wall and extending laterally from the mid-portion, a side wall adjoining the outer portion of the front wall and extending rearwardly therefrom, and a cap secured to the tops of the front and side walls and having surfaces sloping toward the latter mentioned walls in obtuse angular relationship thereto.

References Cited in the file of this patent

UNITED STATES PATENTS

| 2,669,338 | Kling | Feb. 16, 1954 |

FOREIGN PATENTS

| 848,950 | France | Aug. 7, 1939 |